(12) United States Patent
Levin et al.

(10) Patent No.: US 10,795,738 B1
(45) Date of Patent: Oct. 6, 2020

(54) CLOUD SECURITY USING SECURITY ALERT FEEDBACK

(71) Applicant: Microsoft Technology Licensing, LLC, Redmond, WA (US)

(72) Inventors: Roy Levin, Redmond, WA (US); Tamer Salman, Redmond, WA (US); Yotam Livny, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/364,616

(22) Filed: Mar. 26, 2019

(51) Int. Cl.
*G06F 9/54* (2006.01)
*G06F 21/31* (2013.01)
*G06F 16/9035* (2019.01)

(52) U.S. Cl.
CPC .......... *G06F 9/542* (2013.01); *G06F 16/9035* (2019.01); *G06F 21/316* (2013.01)

(58) Field of Classification Search
None
See application file for complete search history.

(56) References Cited

U.S. PATENT DOCUMENTS

| | | | | |
|---|---|---|---|---|
| 7,860,006 | B1* | 12/2010 | Kashyap | H04L 41/0893 370/235 |
| 8,797,891 | B2* | 8/2014 | Agarwal | H04L 41/0681 370/252 |
| 2016/0110224 | A1* | 4/2016 | Cao | G06F 11/00 718/104 |
| 2017/0118239 | A1* | 4/2017 | Most | H04L 63/1425 |
| 2018/0219888 | A1 | 8/2018 | Apostolopoulos | |
| 2018/0248893 | A1 | 8/2018 | Israel et al. | |
| 2018/0295149 | A1 | 10/2018 | Gazit et al. | |
| 2019/0199688 | A1* | 6/2019 | Wallace | H04L 63/1441 |
| 2019/0220580 | A1* | 7/2019 | Brison | G06F 21/00 |

FOREIGN PATENT DOCUMENTS

WO 2017221088 A1 12/2017

OTHER PUBLICATIONS

"International Search Report and Written Opinion Issued in PCT Application No. PCT/US2020/021665", dated May 4, 2020, 28 Pages.

* cited by examiner

*Primary Examiner* — Umut Onat
(74) *Attorney, Agent, or Firm* — Schwegman Lundberg & Woessner, P.A.

(57) ABSTRACT

Generally discussed herein are devices, systems, and methods for computer or other network device security. A method can include providing an alert to a device of a first cloud user in response to determining an operation performed on a cloud resource is inconsistent with a behavior profile that defines normal operation of the cloud resource, receiving feedback from the first cloud user regarding the alert, and generating, for a second, different cloud user and by prioritizing a second alert based on the feedback from the first cloud user, a second alert.

20 Claims, 6 Drawing Sheets

CLOUD SECURITY USING SECURITY ALERT FEEDBACK

BACKGROUND

In the field of security, there is an arms race between perpetrators and security professionals. While perpetrators develop increasingly advanced attack methods and tools, security professionals devise new ways for detecting them. This leads to continuously escalating number of detection signals provided to security officers and demanding their attention.

SUMMARY

This summary section is provided to introduce aspects of embodiments in a simplified form, with further explanation of the aspects of embodiments following in the detailed description. This summary section is not intended to identify essential or required features of the claimed subject matter, and the combination and order of elements listed in this summary section are not intended to provide limitation to the elements of the claimed subject matter.

Generally discussed herein are devices, systems, machine-readable mediums, and methods for cloud resource computer security. A system can include processing circuitry, and a memory device coupled to the processing circuitry, the memory device including instructions stored thereon for execution by the processing circuitry to perform operations for computer security, the operations comprising providing an alert to a device of a first cloud user in response to determining an operation performed on a cloud resource is inconsistent with a behavior profile that defines normal operation of the cloud resource. The operations can include receiving feedback from the first cloud user regarding the alert. The operations can include generating, for a second, different cloud user and by prioritizing a second alert based on the feedback from the first cloud user, a second alert.

The operations can include, before generating the second alert, identifying the second cloud user by determining that a characteristic of the first cloud user is the same as a characteristic of the second cloud user. The operations can include determining whether the second cloud user has provided less feedback than the first cloud user. Determining that the characteristic of the first cloud user is the same as the characteristic of the second cloud user includes using an embedding technique or a collaborative filtering technique. The characteristic can include at least one of: resource access, account type, resource subscription, number of cloud resources subscribed to, time of access of a cloud resource, or number of users.

The operations can further include inferring further feedback from the first cloud user based on interaction with security alerts on the device. Inferring the feedback can include: identifying that the first cloud user has selected the alert and has not selected a third alert provided to the first cloud user and prioritizing future alerts of a same type as the alert over future alerts of a same type as the third alert. The feedback can include data indicating whether the alert is relevant to the first cloud user, not relevant to the first cloud user, the security alert is a false positive, or the security alert is a true positive. Generating the second alert can include altering a score associated with the second alert based on the feedback from the first cloud user.

A non-transitory machine-readable medium can include instructions that, when executed by a machine, configure the machine to perform operations for cloud resource security using security alert feedback, the operations comprising providing an alert to a device of a first cloud user in response to determining an operation performed on a cloud resource is inconsistent with a behavior profile that defines normal operation of the cloud resource. The operations can include receiving feedback from the first cloud user regarding the alert. The operations can include generating, for a second, different cloud user that includes a same characteristic as the first cloud user and by prioritizing a second alert based on the feedback from the first cloud user, the second alert. The operations can further include one or more of the operations of the processing circuitry discussed elsewhere herein.

A method for cloud resource security using security alert feedback can include providing an alert to a device of a first cloud user in response to determining an operation performed on a cloud resource is inconsistent with a behavior profile that defines normal operation of the cloud resource. The method can further include receiving feedback from the first cloud user regarding the alert. The method can further include generating, using an embedding technique, for a second, different cloud user that includes a same characteristic as the first cloud user, and by prioritizing a second alert based on the feedback from the first cloud user, the second alert. The method can further include one or more of the operations of the non-transitory machine-readable medium discussed elsewhere herein.

DETAILED DESCRIPTION

Figure 1:
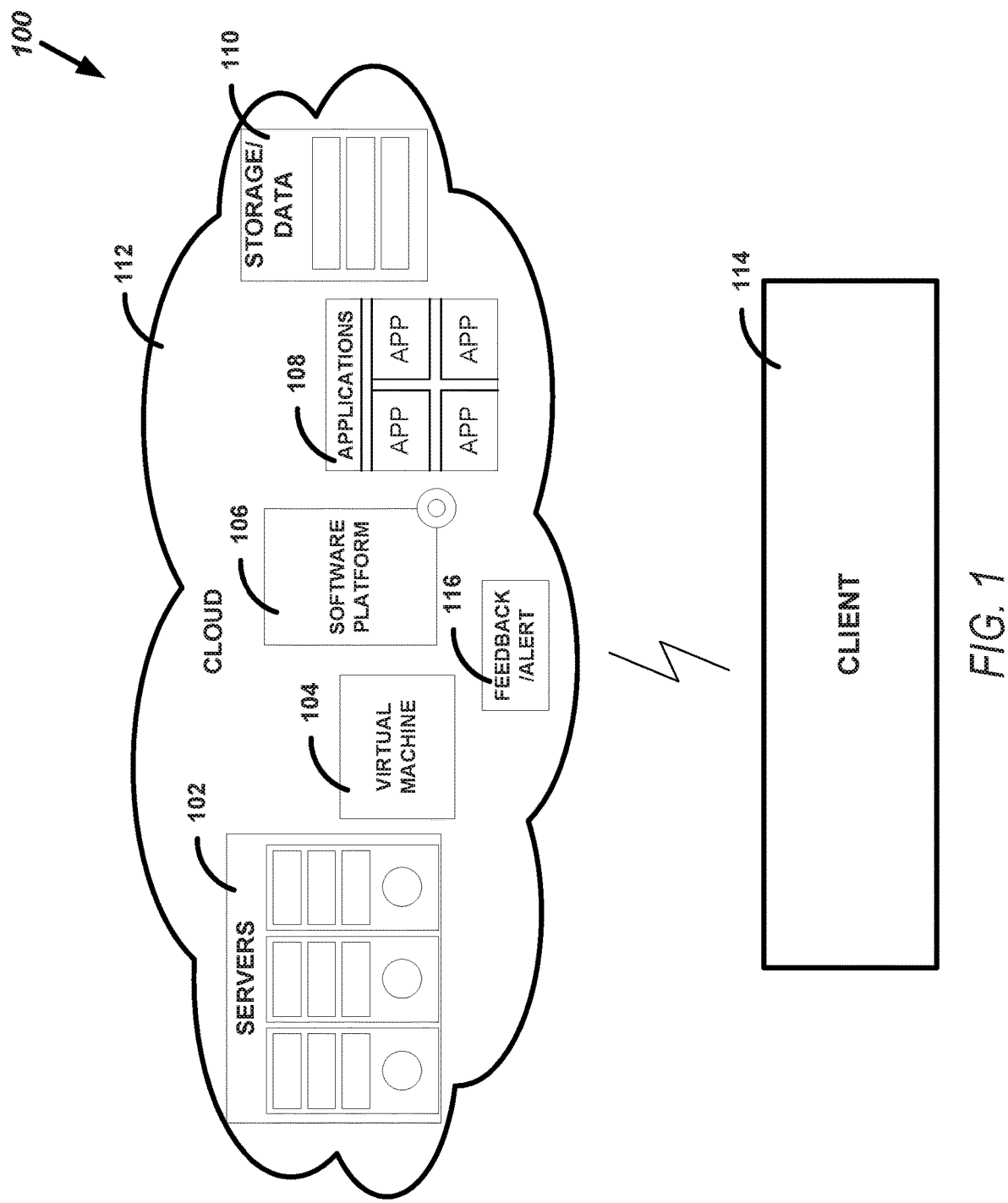
FIG. 1 illustrates, by way of example, a diagram of an embodiment of a cloud service system.

In the following description, reference is made to the accompanying drawings that form a part hereof. The drawings show, by way of illustration, specific embodiments which may be practiced. These embodiments are described in sufficient detail to enable those skilled in the art to practice the embodiments. It is to be understood that other embodiments may be utilized and that structural, logical, and/or electrical changes may be made without departing from the scope of the embodiments. The following description of embodiments is, therefore, not to be taken in a limited sense, and the scope of the embodiments is defined by the appended claims.

The operations, functions, or methods described herein may be implemented in software in some embodiments. The software may include computer executable instructions stored on computer or other machine-readable media or storage device, such as one or more non-transitory memories (e.g., a non-transitory machine-readable media) or other type of hardware-based storage devices, either local or networked. Further, such functions may correspond to subsystems, which may be software, hardware, firmware or a combination thereof. Multiple functions may be performed in one or more subsystems as desired, and the embodiments described are merely examples. The software may be executed on a digital signal processor, application specific integrated circuit (ASIC), microprocessor, central processing unit (CPU), graphics processing unit (GPU), field programmable gate array (FPGA), or other type of processor operating on a computer system, such as a personal computer, server or other computer system, turning such computer system into a specifically programmed machine. The functions or algorithms may be implemented using processing circuitry. Processing circuitry can include electric and/or electronic components. Electric and/or electronic components can include one or more transistors, resistors, capacitors, inductors, amplifiers, modulators, demodulators, antennas, radios, regulators, diodes, oscillators, multiplexers, logic gates, buffers, caches, memories, GPUs, CPUs. FPGAs, ASICs, or the like.

In the field of computer and network security, as previously discussed in the Background, there is an arms race between perpetrators and security professionals. In the arms race, perpetrators develop increasingly advanced attack methods and tools and security professionals devise new ways for detecting the attacks. The new techniques of detecting the attacks are added to old techniques, thus escalating a number of detection methods and corresponding detection data provided to security officers. This increasing amount of data is difficult to manage and act upon in a triage manner. Further, the increased security alerts frustrate users as some users find some alerts not relevant whereas another user will find the same alerts relevant and worthy of action.

Consider that a first attack can be at a client, another attack can be at an infrastructure device, and yet another attack can be at a database. All of the attacks can be consequential, but it is very difficult for a security officer to determine which of the attacks to abate, fix, or prevent, if the security officer is forced to choose. One attack can force the data of the database to be unavailable, thus making the services that access the database unavailable. Another attack can be at a client, thus reducing an employee's output and interfering with business and technical activities. Another attack can be at a firewall, allowing unauthorized users to access devices of the network and carry out further attacks or bog down network resources with unauthorized access.

A currently accepted way to present the attack detection data to an administrative user is via a unified dashboard. This allows the security officer easily access to all the information. However, the sheer number of different security alerts might result in alert fatigue, alert churn, which reduces the security officer's attention, and reduces the security officer's confidence in the quality of alerts. The increased data can and has led to vital alerts going unnoticed and further network damage being done. Thus, this lack of sufficient filtering of the security data leads to wasted time, resources, and efforts in attending to and repairing damage from attacks that might have otherwise been preventable. Embodiments herein can help filter the security data so that the most relevant and most important security data is readily identifiable and accessible in the dashboard.

Cloud users often use multiple cloud resources to form a system of cloud resources or otherwise access resources for their purposes. These systems are vulnerable to attacks of a variety of attack types. To help mitigate the risk, cloud providers, such as Microsoft Corporation of Redmond, Wash., United States, as well as other third-party security solution vendors, offer attack detection systems. These attack detection systems provide a user with one or more alerts in response to detecting an attack on a cloud resource to which the cloud customer (e.g., user or organization) has access. However, these detection systems may raise a prohibitive number of false alarms. For users that operate with more cloud resources, security analysts may be flooded with many different types of security alerts. In addition, security personnel may want to focus their attention on certain types of alerts and away from other types of alerts.

Improving the quality of alerts helps reduce the number of false positives, yet this alone may not be enough. Based on the user's persona, users may be interested in different types of alerts. Embodiments provide an improved approach. Embodiments use customer feedback to tailor alerts which are of interest to a specific user based on feedback from the user, feedback from other users (e.g., users with specific characteristics in common with the user), or a combination thereof.

Previous approaches involving alert provision exist. These alert provision systems operate by (1) Ranking alerts according to their perceived severity or perceived confidence, (2) Grouping alerts, (3) Automatically mitigating an effect associated with the alert, or (4) Supporting manual filtering according to alert types. However, existing cloud security solutions do not tailor security alerts based on implicit or express customer preferences. Previous approaches also focus on reducing the number of false-positive attack notices produced by alerts. This approach does not suffice to address the overall problem of increasing security.

FIG. 1 illustrates, by way of example, a diagram of an embodiment of a cloud service system 100. The cloud service system 100 may provide cloud computing services to various computing systems such as desktops, laptops, tablets, smartphones, embedded computers, point-of-sale terminals, and so on. The cloud service system 100 can include servers and storage devices and provide various software products such as operating systems, databases, and applications.

Rather than maintaining their own data centers, many enterprises (cloud customers) subscribe as customers of a database service of the cloud service system 100 to store and process their data. For example, a retail company may subscribe to a database service to store records of the sales transactions at the company's stores and use an interface provided by the database service to run queries to help in analyzing the sales data. As another example, a utility company may subscribe to a database service for storing meter readings collected from the meters of its customers. As yet another example, a governmental entity may subscribe to a database service for storing and analyzing tax return data of millions of taxpayers.

Enterprises that subscribe to the cloud service system 100 want data privacy and security assurances. Although the cloud service system 100 can employ many techniques to help preserve the privacy of customer data, parties seeking to steal such customer data are continually devising new counter-techniques to access the data.

The cloud infrastructure 112 is a global network of servers and other computer resources that are accessible through the Internet and provides a variety of hardware and software services. These resources are designed to either store and manage data, run applications, or deliver content or a service. Services can include streaming videos, web mail, office productivity software, or social media, among others. Instead of accessing files and data from a local or personal computer, cloud data is accessed online from an Internet-capable device, such as the client 114.

The system 100 as illustrated includes a cloud infrastructure 112 and a client 114. The cloud infrastructure 112 includes computer devices which the client 114 can access for their own computing needs. The computer devices as illustrated include servers 102, virtual machines 104, software platform 106, applications 108, storage/data 110, and feedback/alerts 116.

The servers 102 can provide results as a result of a request for computation. The server 102 can be a file server that provides a file in response to a request for a file, a web server that provides a web page in response to a request for website access, an electronic mail server (email server) that provides contents of an email in response to a request, a login server that provides an indication of whether a username, password, or other authentication data are proper in response to a verification request.

The virtual machine (VM) 104 is an emulation of a computer system. The VM 104 provides the functionality of a physical computer. VMs can include system VMs that provide the functionality to execute an entire operating system (OS) or process VMs that execute a computer application in an isolated, platform-independent environment. VMs can be more secure than a physical computer as an attack on the VM is merely an attack on an emulation. VMs can provide functionality of first platform (e.g., Linux, Windows, or another OS) on a second, different platform.

The software platform 106 is an environment in which a piece of software is executed. The software platform 106 can include hardware, OS, a web browser and associated application programming interfaces (APIs), or the like. The software platform 106 can provide tools for developing more computer resources, such as software. The software platform 106 can provide low-level functionality for a software developer.

The applications 108 can be accessible through one of the servers 102, the VM 104, a container (see FIG. 3), or the like. The applications 108 provide compute resources to a user such that the user does not have to download or execute the application on their own computer. The applications 108, for example, can include a machine learning (ML) suite that provides configured or configurable ML software. The ML software can include artificial intelligence type software, such as can include a neural network (NN) or other technique. The ML or AI techniques can have memory or processor bandwidth requirements that are prohibitively expensive or complicated for some cloud customers to implement or support.

The storage/data 110 can include one or more databases, containers, or the like of memory access. The storage/data 110 can be partitioned such that a given user has dedicated memory space. A service level agreement (SLA) generally defines an amount of uptime, downtime, maximum or minimum lag in accessing the data, or the like.

The client 114 is a compute device capable of accessing the functionality of the cloud infrastructure 112. The client 114 can include a smart phone, tablet, laptop, desktop, a server, television or other smart appliance, a vehicle (e.g., a manned or unmanned vehicle), or the like. The client 114 accesses the resources provided by the cloud infrastructure 112. Each request from the client 114 can be associated with an internet protocol (IP) address identifying the client 114, a username identifying a user of the device, a customer identification indicating an entity that has permission to access the cloud infrastructure 112, or the like.

The feedback/alerts 116 can provide a cloud user with the ability to indicate which security alerts they find helpful, irrelevant, or the like. By providing the feedback, the user can influence the alerts provided to the cloud user (e.g., the client 114). The feedback can cause the alert to be altered (e.g., prioritized, ranked, include different content, or the like). More detail regarding the feedback/alert 116 is provided regarding FIGS. 2-6.

The cloud infrastructure 112 is accessible by any client 114 with sufficient permission. Usually a customer will pay for or otherwise gain permission to access the cloud infrastructure 112 using one or more devices. Since multiple services and multiple clients 114 with different habits can access the cloud infrastructure 112, it is difficult to provide a "one size fits all" security solution. Typically, an attack on the server 102 is different than an attack on the VM 104, which is different than an attack on a container, etc. These different attack vectors are usually handled by instantiating different security techniques with monitoring at each device. Also, these attack vectors can be related, as an attack on a container can be triggered by an impersonation attack, which can be detected by identifying an increase in failed login attempts or abnormal usage of a resource of the cloud infrastructure 112 (relative to the user permitted to access). Further, these typical attacks result in a number of alerts being provided to the customer (a security officer of the customer) without explanation that the alerts regard or might regard a related security breach event. These alerts are generally from disparate sources that have different scope and severity metrics. The security officer is then forced to determine the importance of and relation between the security alerts. With an increasing number of threat vectors, corresponding detection types, or types of resources being accessed in the cloud infrastructure 112 by a customer, the number of alert detection sources, scopes, and metrics increases to become quickly unmanageable.

Embodiments provide solutions to filter alerts of a cloud customer based on feedback (inferred or express) from the cloud customer. The solutions can alter alerts provided to a second cloud customer based on feedback from a similar first cloud customer. The feedback can include data about a similar cloud resource in some embodiments.

Figure 2:
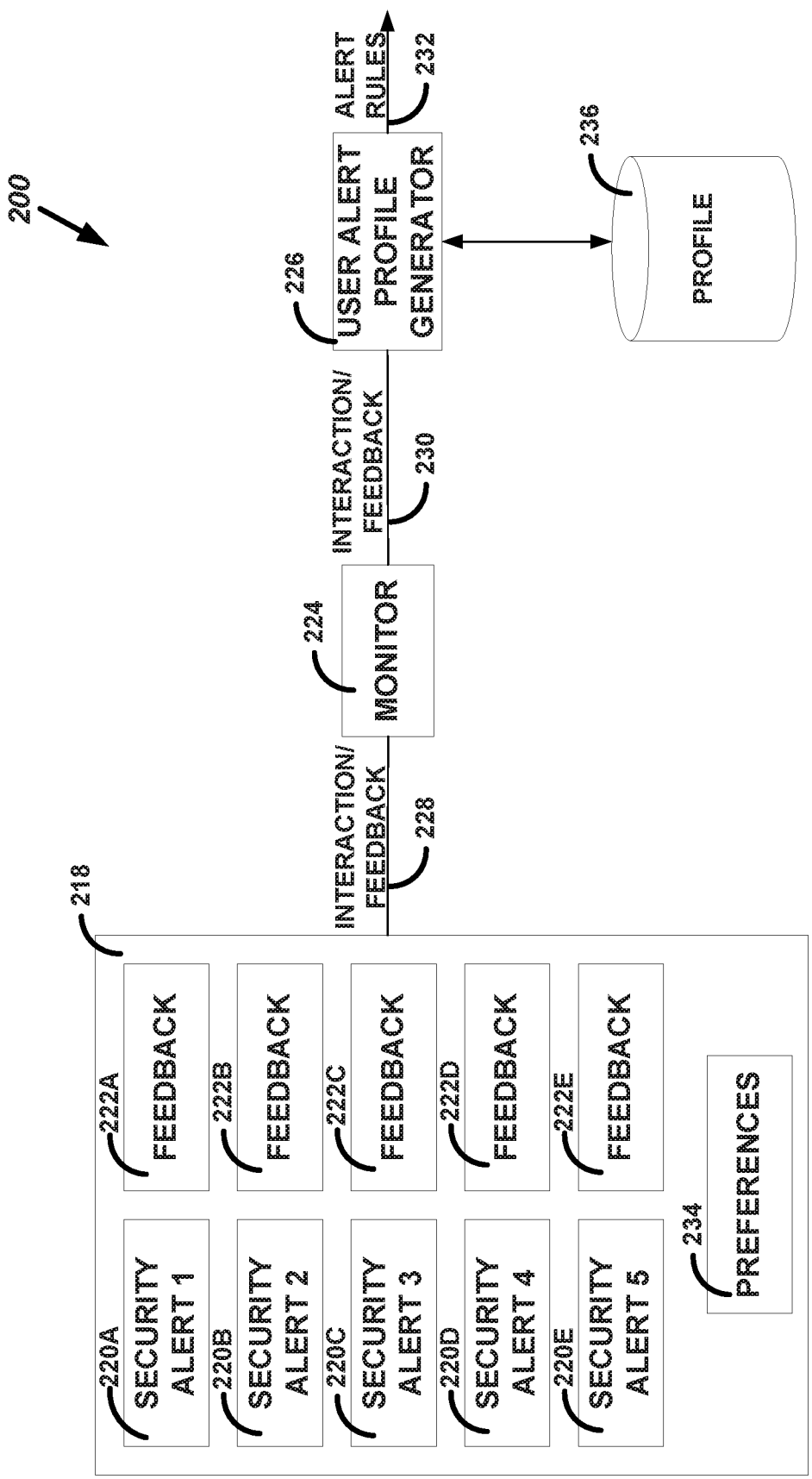
FIG. 2 illustrates, by way of example, a diagram of an embodiment of a system for cloud resource security management.

FIG. 2 illustrates, by way of example, a diagram of an embodiment of a system 200 for cloud resource security management. One or more components (e.g., UI 218, monitor 224, or user alert profile generator 226) of the system 200 can be implemented by the feedback/alert 116. The system 200 as illustrated includes a UI 218, a monitor 224, a user alert profile generator 226, and a profile database 236. The UI 218 can be accessible by a user (cloud customer) with sufficient permissions. The user can access the UI 218 through a web page, application, application programming interface (API), or the like. The user can use the client 114 to access the view of the UI 218.

The UI 218 provides a view of alerts 220 for cloud resources accessible by the user and respective feedback controls 222 for the alerts 220. Each alert 220 regards a detected anomalous behavior performed on a cloud resource associated with the user (to which the user has access). The alert 220 can regard one or more specific resources (e.g., the server 102, VM 104, software platform 106, application 108, storage/data 110) to which the user has been given access permissions. The alert 220 can include an indication of a type of anomalous operation performed on the resource. Types of anomalous operations include, for example a fuzzing attempt (inputting a large amount of random data (called fuzz) to test the subject in an attempt to make it crash), a failed login attempt (or number of failed login attempts), an unrecognized Internet Protocol (IP) address attempted access, a data exfiltration operation, an unrecognized device attempted access, an application attempted to access an unauthorized port, a cloud resource was accessed an abnormal number of times in a specified time, or the like. The alerts 220 can be provided to a user via a portal (e.g., the UI 218), electronic mail, application programming interface (API), simple message service (SMS) message, or other means.

The UI 218 includes a software control 222 which allows a user to provide feedback regarding an associated alert 220. In response to selecting the control 222, a variety of feedback options that, when selected by the user, can be associated with the security alert 220 and provided to a corresponding cloud security service provider.

The feedback can include one or more of: (1) false positive (indicating that the alert was triggered but the anomalous behavior or the effect of the anomalous behavior was not present); (2) true positive (the alert was provided and the anomalous behavior or the effect of the anomalous behavior was present); (3) useful (the user found the alert to be helpful, this is sometimes referred to as "relevant"); (4) not useful (the user found the alert to be irrelevant, this is sometimes referred to as "not relevant"); or a combination thereof. For example, the alert can be a true positive and the user may still find it not relevant. This can be for a number of reasons, such as the user being concerned with other issues than if a user had a failed login attempt.

In some embodiments, further details regarding a security alert 220 can be provided in response to a user in response to selection of the security alert 220. The details can identify the cloud resource, the action performed, a time or date on which the action was detected, a severity score indicating how much damage the operation can cause, a confidence associated with the detection (a percentage, decimal value, integer value, or the like), or a combination thereof. Selection can include a touch on a touchscreen, a click and release of a mouse, a verbal command, an eye dwell, or the like.

The UI 218 as illustrated includes a preferences control 234. A user can alter how many alerts 220, what types of alerts 220, and how the alerts 220 are provided to the user. For example, a user can filter the alerts 220 to include only alerts associated with a specific type of attack, a specific resource, or to not include alerts associated with an IP address, user, or the like.

A monitor 224 can record user interaction/feedback 228 by the UI 218. The interaction/feedback 228 can include a user selecting the security alert 220, the feedback provided using the control 222, or the like. The interaction/feedback 228 can be filtered by the monitor 224. The filtering can include deduplicating or otherwise removing redundant or unimportant information from the interaction/feedback 228. For example, the feedback provided through a first control 222A can identify the security alert 220A as not relevant, and feedback provided through a second control 222C can identify a same alert for a different cloud resource as not relevant. The monitor 224 can aggregate the interaction/feedback 228 or remove one of the feedback instances as redundant.

The monitor 224 can record implicit feedback determined based on the interaction/feedback 228. The implicit feedback can include a rank of alert types or cloud resources based on user interaction with the alerts 220 on the UI 218. For example, consider an example in which the security alert 220B regards an alert of type 1, the security alert 220D regards an alert of type 2, and the security alert 220E regards an alert of type 3. Further consider that, in this example, the monitor 224 detects that the user selects the security alert 220E, then the security alert 220B, and then the security alert 220D and that the user indicated that each of the alerts 220B, 220D, and 220E are relevant. The monitor 224 can determine, based on these user interactions with the UI, that the security alert 220E is more important than the security alert 220B, which is more important than the security alert 220D, which is more important than all of the other, non-selected security alerts 220A, 220C. The monitor 224 can indicate this in the interaction/feedback 230.

The interaction/feedback 228 can indicate a corresponding user identification and the interaction/feedback 230 can indicate the user identification. An organization can have multiple users that access the UI 218 and each of those users can have different alert expectations. In some embodiments, the user alert profile generator 226 can generate the alert rules per organization or per user.

The monitor 224 can produce interaction/feedback 230 for use by a user alert profile generator 226. The user alert profile generator 226 receives the interaction/feedback 230 and generates rules 232 to be followed in providing alerts to the user, through the user interface 218. The rules 232 can include alert types for which the user is not interested in receiving alerts (as determined expressly or implicitly based on the interaction/feedback 228).

In some embodiments, the user alert profile generator 226 can have little to no data regarding a specific user or organization. In such embodiments, the user alert profile generator 226 uses interaction/feedback 230 data from a user with one or more same or similar characteristics as the user. In some embodiments, the interaction/feedback 230 for the other user can be augmented with the interaction/feedback 230 for the user and the user alert profile generator 226 can user the aggregated data to generate the alert rules 232 for the user. In other embodiments, the user alert profile generator 226 can use the user alerts 220 for the other user as the alerts for the user.

In general, and as previously discussed, cloud security centers provide a view of alerts for cloud resources. Usually the alerts are aggregated to a single location. The user can access the security center through a cloud security center portal. Some alerts can be relevant to the user and some can be not relevant to the user. The user can provide feedback (false positive, true positive, not relevant, relevant, etc.) using the portal. A goal of the user alert profile generator 226 can be to learn a behavioral pattern for each user, organization, or the like with regard to interaction with the security alerts 220.

The user alert profile generator 226 can improve alert generation generally and specifically based on preferences. The user alert profile generator 226 can use many techniques to learn the alert rules 232. In some embodiments, the user alert profile generator does not include sufficient information to learn from just the feedback provided by an individual cloud customer. This can be for a user that is relatively new or has not provided sufficient feedback using the control 222. In such instances, the user alert profile generator 226 can use alert rules from comparable users or organizations to supplement the rules that can be learned based on the user feedback. In some instances, there is no feedback and the user alert profile generator 226 can provide alert rules 232 based solely on one or more similar cloud customers.

The user alert profile generator 226 can receive user characteristics from a profile database 236. The profile database 236 can include profiles of users pertinent to generating alerts, alert rules, alert scores, or a combination thereof. The profile database 236 can include profiles indexed by user identification. The user identifications can be associated with a group identification that indicates a group of similar users. The group identification can point to a list of user identifications that include similar characteristics to the user in question. The list of user identifications can be learned or otherwise generated by the user alert profile generator 226, such as by using a dimensional reduction technique, such as collaborative filtering, embedding, or the like.

A similar user or organization is one with one or more same characteristics as the user or organization in question. The characteristics can include behaviors of the user or organization. Such characteristics can include one or more of resource access, account type, resource subscription, number of cloud resources subscribed to, time of access of cloud resources, size (e.g., number of employees) of the organization, or the like. The characteristics can additionally or alternatively include feedback provided by the user. The feedback can include alerts that were dismissed, alerts deemed not relevant, alerts deemed relevant, or other feedback.

Similar users or organizations can be identified using collaborative filtering or other embedding technique. An embedding technique receives a feature and reduces its dimensionality to some degree. Collaborative filtering is an example of such an embedding technique. In general, collaborative filtering is the process of filtering for information or patterns using techniques involving collaboration among multiple agents, viewpoints, data sources, or the like. More specifically, collaborative filtering makes a prediction (filtering) about the interests of a user by collaborating (collecting information from many users). An assumption of collaborative filtering is that if a first user has the same opinion as a second user on an issue, the first user is more likely to have the same opinion on a different issue as the second user than that of a randomly chosen user. The prediction (dimensionality reduction) is specific to the user, but uses information from many users.

Collaborative filtering in the context of this disclosure can include a user expressing their preferences by providing feedback on security alerts. These preferences (sometimes called characteristics) can be viewed as an approximate representation of the user's interest in the corresponding domain. The collaborative filter matches the cloud customer ratings against ratings of other users and finds the users with most "similar" tastes. With similar users, the user alert profile generator can generate alert rules 232 that the similar users have not yet been rated by this user.

Another embedding technique can be used to identify a similar cloud customer. In natural language (NL) processing, a user can receive a sentence and want to classify the sentence. The words of the sentence are converted to a vector that groups similar vectors in a vector space. Words with different meanings are mapped to vectors that are further apart than words with similar meaning. A similar technique can be used to identify similar users or organizations. Users characteristics can include user alert preferences as determined by feedback or other means. Users characteristics can be converted to a vector that groups similar vectors by distance. Alert rules 232 from one or more users or organizations closest to the user in the vector space can be used to supplement or augment the alert rules for the user.

The alert rules 232 can include a categorical rule or a rule with a threshold probability. For example, a categorical rule can include "always provide an alert regarding resource X" or "never provide an alert regarding a first time or second consecutive login failure". The categorical rule can be learned from repeated, consistent feedback from the user indicating that an associated alert is not relevant. In some embodiments, a categorical rule can only be generated based on direct feedback from the user and not from feedback from other users (e.g., using an embedding technique, collaborative filtering technique, or the like).

The rule with the threshold can include, for example, "provide alert for resource X if determined importance to user is greater the Z1" or "provide alert for alert type W if determined importance is greater than Z2". The threshold can be learned by the user alert profile generator 226 based on user characteristics of the user, user characteristics of similar users, or a combination thereof. For example, if a user mostly provides a not relevant feedback for alert type AI, then the threshold for reporting alerts of type AI in the future can increase.

Figure 3:
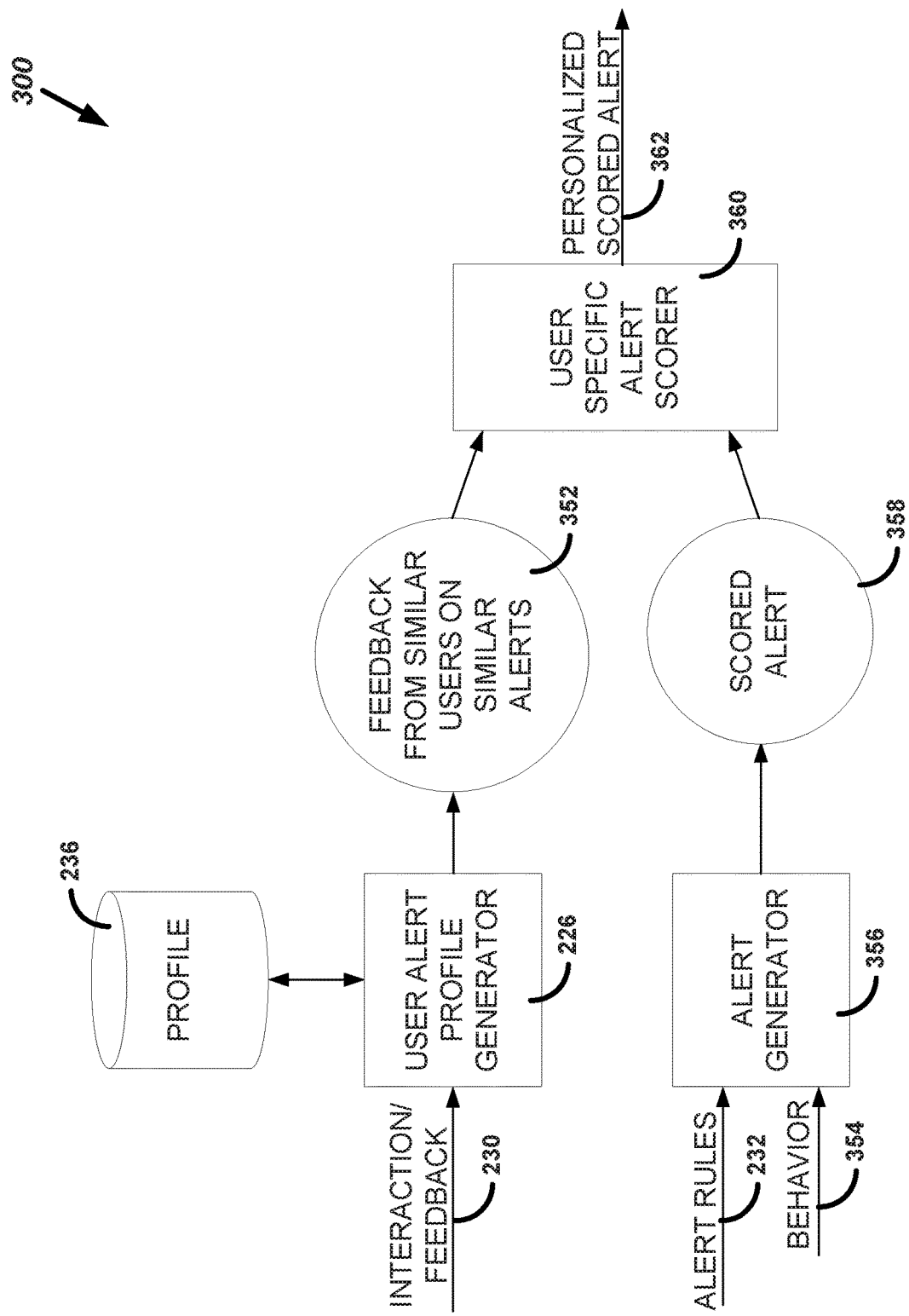
FIG. 3 illustrates, by way of example, a diagram of an embodiment of a system for generating a personalized scored alert.

FIG. 3 illustrates, by way of example, a diagram of an embodiment of a system 300 for generating a personalized scored alert 362. One or more components (e.g., alert generator 356, user specific alert scorer 360) of the system 300 can be implemented by the feedback/alert 116. The system 300 as illustrated includes the user alert profile generator 226, feedback from similar users on similar alerts 352, an alert generator circuitry 356, a scored alert 358, and a user specific alert scorer 360.

The user alert profile generator 226 can receive the interaction/feedback 230 from the monitor 224 (see FIG. 2). The user alert profile generator 226 can generate the alert rules 232 as discussed regarding FIG. 2. The user alert profile generator 226 can retrieve feedback from similar users on similar alerts 352 from the profile database 236. In some embodiments, rather than providing the feedback from similar users on similar alerts 352 the user alert profile generator can retrieve one or more alert rules 232 of similar users on similar alerts.

The alert generator circuitry 356 can receive or retrieve the alert rules 232, such as generated by the user alert profile generator 226 and retrieved from the profile database 236. The alert generator circuitry 356 can receive or retrieve a behavior 354 and generate an alert 220. The alert generator circuitry 356 can generate the alert 220 in response to determining the behavior 354 is consistent with an attack or adverse operation on a cloud resource. The alert generator circuitry 356 can determine a score to be associated with the alert 220 based on the alert rules 232. The scored alert 358 can include the alert 220 along with an associated score. The score can indicate a relative importance of the alert 220 to the user based on the alert rules 232. As previously discussed, the alert rules 232 can be determined based on feedback from the user alone, a similar user, or a combination thereof. The score can include, for example, a lower relative number for an alert that the user has previously deemed not relevant and a higher relative number for an alert that the user has previously deemed relevant, or vice versa.

The user specific alert scorer 360 can receive the scored alert 358, which can be based on the user alone, and feedback from similar users on similar alerts 352. The user specific alert scorer 360 can generate a personalized scored alert 362 based on the input thereto (e.g., the feedback from similar users on similar alerts 352 and the scored alert 358). The user specific alert scorer 360 can determine the score as a weighted combination of the scored alert 358 and the feedback from similar users on similar alerts 352. The scored alert 358 is from the alert generator 356. The scored alert 356 can be generated based on rules and on behavioral aspects of the environment (e.g., using ML). In embodiments, the scored alert 358 can include an alert accompanied with a score that can be manually determined by an expert or is an output of the alert generator 356. This allows flexibility to provide different scores to different alerts based on the alert itself and based on the properties of the findings if the alert generator 356. In some embodiments, the threshold (if there is a threshold) in the alert rules 232 can be used by the user specific alert scorer 360 to determine the personalized scored alert 362.

The personalized scored alerts 362 for a specific user can be aggregated. The alerts 220 with the highest scores can be provided to the user, such as through the UI 218. The preferences control 234 can specify the number of alerts 220 provided on the UI 218.

Figure 4:
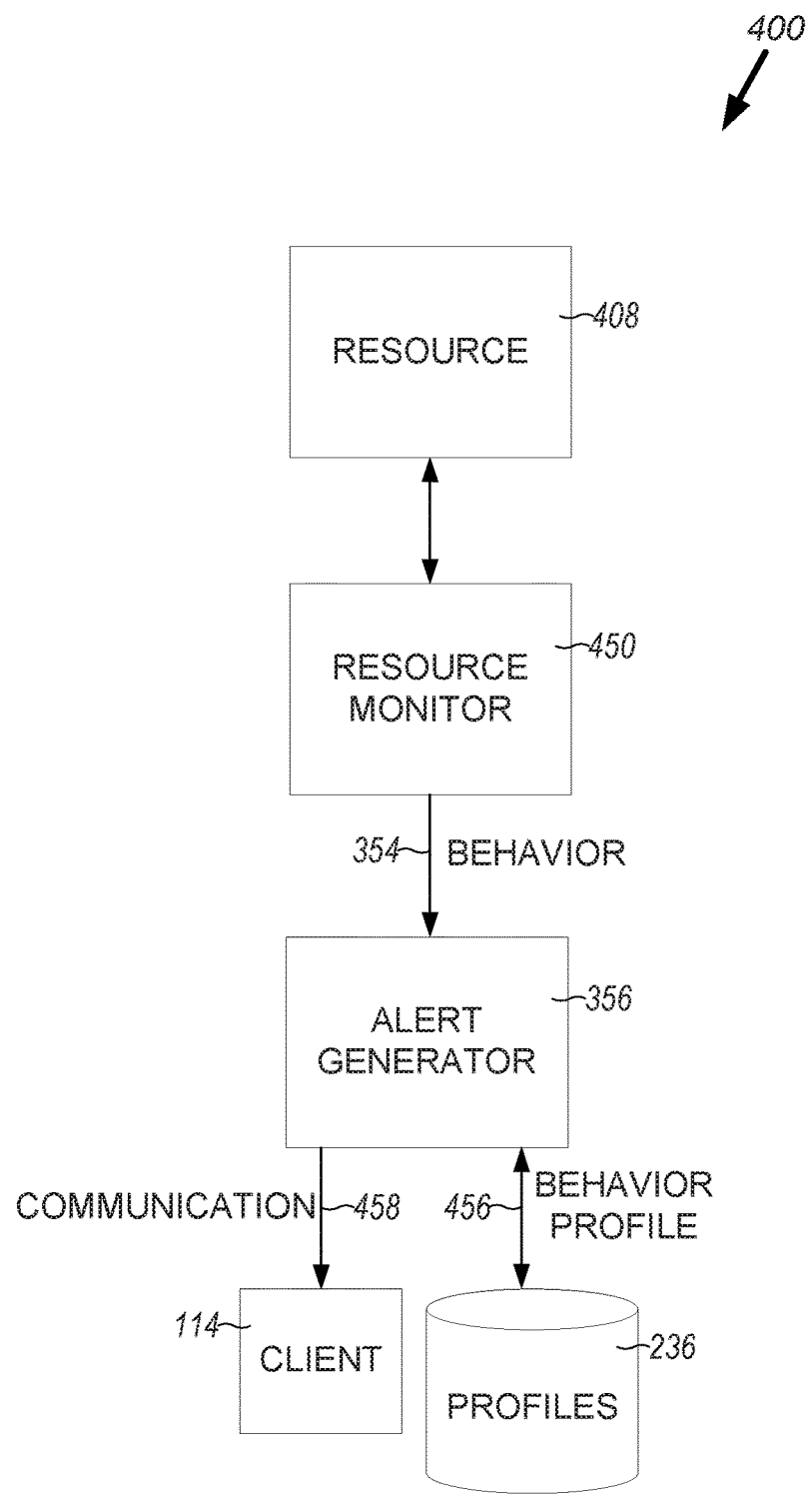
FIG. 4 illustrates, by way of example, a diagram of an embodiment of a system for behavior monitoring.

FIG. 4 illustrates, by way of example, a diagram of an embodiment of a system 400 for behavior monitoring. One or more components (e.g., resource monitor 450) of the system 400 can be implemented by the feedback/alert 116. The system 400 as illustrated includes a deployed resource 408 (e.g., a resource of the cloud infrastructure 112), a resource monitor 450, and alert generator circuitry 356.

The resource monitor 450 (e.g., VM manager, container monitor, resource agent, or the like) can record resource actions 454 that occur using the resource 408 or that access resources external to the resource 408. The resource actions 454 can include access of the resource 408, access of a port and a corresponding port number, an internet protocol (IP) address of a data or operation request, a read or write to a process, executing a process, issuing or receiving a communication from another device, process bandwidth used, memory space allocated or consumed, time duration of or between specific operations, an output of an application executing in the resource 508, or other resource action.

The behavior profile 456 can be generated using an ML resource behavior classifier on properly operating resources and classifying the behavior 354 from the resource monitor 450 of a deployed resource. The ML resource classifier can be used as the behavior profile 456 for the resource 408. The ML resource classifier can return a label for resource actions that indicate "normal" or "abnormal".

The behavior profile 456 can include data indicating normal behavior on or using the resource 408 access of a specific port, read or write to a port or process, executing a process, issuing or receiving a communication from another device, processor bandwidth used, memory space allocated or consumed, time duration between specific operations, communications, port accesses, number of times resource is accessed in a certain time period, or the like. The behavior profile 456 of the resource 408 can specify a behavior and, in some embodiments, a percentage of the total number of corresponding resources that exhibit the behavior. For some behaviors, a mean and deviation (e.g., standard deviation, variance, normal range, or the like) of all or a subset of the resources 408 can be determined and used as part of the behavior profile 456. The behavior profile 456 of a resource 408 can include one or more of the following entries:

[(port $x_0$, percentage), (port $x_1$, percentage), . . . (port $x_{n-1}$, percentage)]
[(process $y_0$, percentage), (process $y_1$, percentage), . . . (process $y_{n-1}$, percentage)]
[(comm, $z_0$, percentage), (comm, $z_1$, percentage), . . . (comm, $z_{n-1}$, percentage)]
[(processor bandwidth, deviation)]
[(memory allocated, deviation)]
[(memory consumed, deviation)]
[(time between processes $y_0$ and $y_1$, deviation)]

The behavior profile 456 can be generated for each user, group of users (e.g., an organization or customer), device (e.g., IP address), or group of devices. One way to generate a profile is by defining profile's properties (used ports, executed processes, network communication, CPU bandwidth, memory bandwidth, communication bandwidth, number of accesses, IP addresses allowed to access, number of executions, average time between accesses or executions, or the like). Generating the behavior profile can include determining statistical expected values and boundaries for one or more properties. For example, for a given resource, 20% of deployments are using only port 20 and 80% are using only port 21. This defines the expected value for that property. Another method is by using machine learning methods, for example, with a class classifier model where the predictor knows to classify each new instance as belonging to the class or not.

The alert generator circuitry 356 can compare the behavior 354, or data derived from the behavior 354, to rules defining normal resource behavior as defined in a corresponding behavior profile 456. The data derived from the behavior 354 can include time between actions, such as a time between a port access, a process execution, or the like, number of accesses or executions in a specified period of time, a time of day at which access or execution generally occurs, or the like. The data derived from the behavior 354 can include memory usage, processing circuitry bandwidth usage, or the like.

The alert generator circuitry 356 can issue a communication 458 including an alert 220 to the client 114. The communication 458 can include data uniquely identifying the resource 408 that is subject of the alert, the behavior 354 that is considered abnormal, a time of the behavior 354, a location (e.g., server identification, geographical location (e.g., of a colocation center or the like), or the like) of the infrastructure 112 on which the resource 408 is operating, or the like.

The client 114 can be associated with a user in charge of maintaining the resource 408. The client 114 can include a smartphone, computer, tablet, laptop, smartwatch, and the alert can include a text, phone call, a direct message communication, or other communication. In some embodiments, the client 114 can include an email server, or the like, through which a user can be notified by email or other communication.

As previously discussed, a user can configure their alert preferences, such as through the control 234. For example, a user can indicate whether they want to block/unblock a resource 408, be notified via email or text (e.g., simple messaging service (SMS)), be notified only on high confidence alerts, be notified of a maximum number of alerts per day or other time period or be notified only on images of a specified type, among other configuration options.

Figure 5:
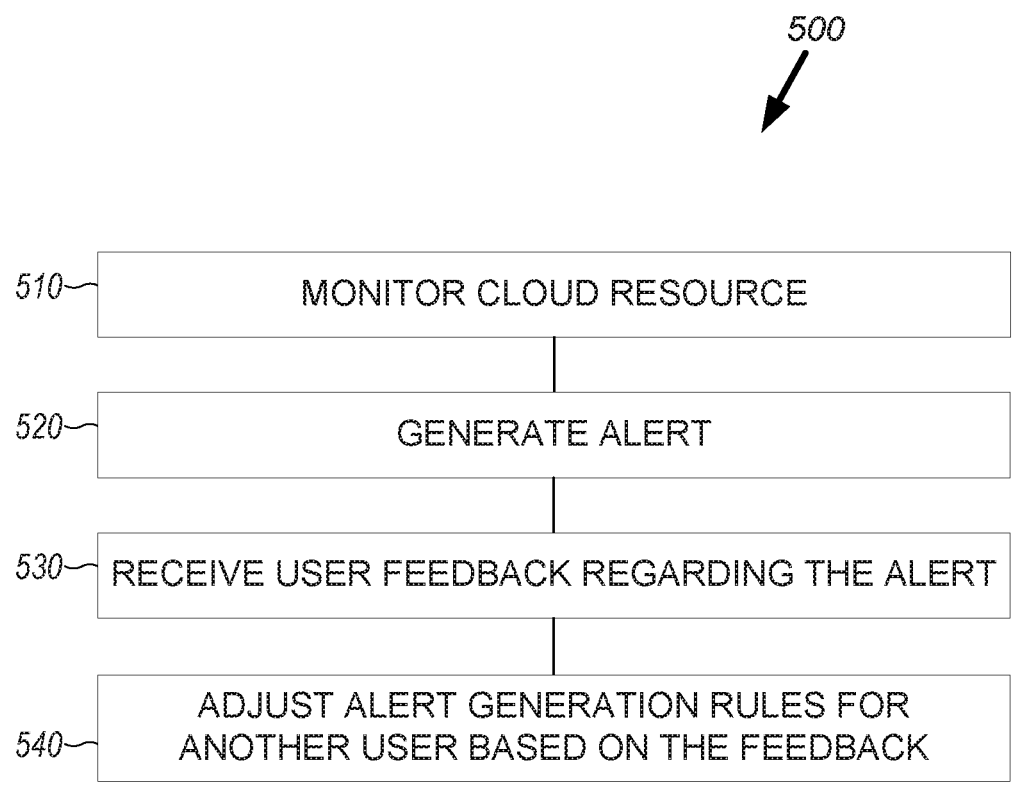
FIG. 5 illustrates, by way of example, a diagram of an embodiment of a method for cloud device security.

FIG. 5 illustrates, by way of example, a diagram of an embodiment of a method 500 for cloud device security. The method 500 as illustrated includes, monitoring behaviors of a cloud resource, at operation 510; generating an alert (in response to detecting an abnormal or adverse behavior at operation 510), at operation 520; receiving user feedback regarding the alert, at operation 530; and adjusting the alert generation rules for another user based on the feedback, at operation 540.

The operation 520 can include providing an alert to a device of a first cloud customer in response to determining an operation performed on a cloud resource is not consistent with a behavior profile indicating normal operation of the cloud resource. The method 500 can further include generating, for a second, different user (the another user), and based on the feedback from the user, a second alert.

The method 500 can further include before generating the second alert, identifying the second user by determining a characteristic of the first cloud customer is the same as a characteristic of the second cloud customer. The method 500 can further include, wherein the second cloud customer has provided less feedback than the first cloud customer regarding the cloud resource or an alert type associated with the alert. The method 500 can further include, wherein identifying the characteristic of the first cloud customer is the same as the characteristic of the second cloud customer includes using dimensionality reduction technique. The method 500 can further include, wherein the characteristic includes at least one of resource access, account type, resource subscription, number of cloud resources subscribed to, time of access of a cloud resource, and number of users.

The method 500 can further include inferring further feedback from the first cloud customer based on interaction with security alerts on the device. The method 500 can further include, wherein inferring the feedback includes identifying the first cloud customer has selected the alert and has not selected a third alert provided to the first cloud customer and prioritizing future alerts of a same type as the alert over future alerts of a same type as the third alert.

The method 500 can further include, wherein the feedback includes data indicating whether the alert is relevant to the first cloud customer, not relevant to the first cloud customer, a false positive, or a true positive. The method 500 can further include, wherein generating the second alert includes altering a score associated with the second alert based on the feedback from the first customer.

Figure 6:
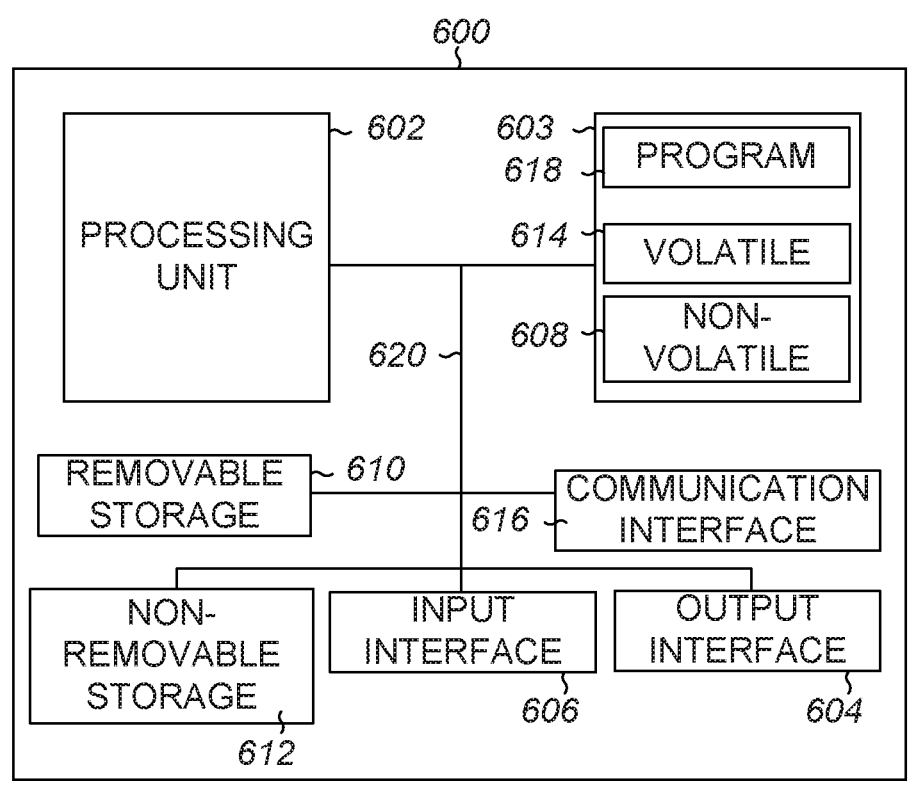
FIG. 6 illustrates, by way of example, a block diagram of an embodiment of a machine (e.g., a computer system) to implement one or more embodiments.

FIG. 6 illustrates, by way of example, a block diagram of an embodiment of a machine 600 (e.g., a computer system) to implement one or more embodiments. One example machine 600 (in the form of a computer), can include a processing unit 602, memory 603, removable storage 610, and non-removable storage 612. Although the example computing device is illustrated and described as machine 600, the computing device may be in different forms in different embodiments. For example, the computing device be part of a smartphone, laptop, desktop, tablet, smartwatch, or other computing device including the same or similar elements as illustrated and described regarding FIG. 6. One or more of the servers 102, VMs 104, software platform 106, applications 108, storage/data 110, client 114, UI 218, monitor 224, user alert profile generator 226, profiles database 236, alert generator circuitry 356, user specific alert scorer 360, resource 408, resource monitor 450, or other component can be implemented using or include one or components of the machine 600. Further, although the various data storage elements are illustrated as part of the machine 600, the storage may also or alternatively include cloud-based storage accessible via a network, such as the Internet.

Memory 603 may include volatile memory 614 and non-volatile memory 608. The machine 600 may include— or have access to a computing environment that includes—a variety of computer-readable media, such as volatile memory 614 and non-volatile memory 608, removable storage 610 and non-removable storage 612. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM). Digital Versatile Disks (DVD) or other optical disk storage, magnetic cassettes, magnetic tape, magnetic disk storage or other magnetic storage devices capable of storing computer-readable instructions for execution to perform functions described herein.

The machine 600 may include or have access to a computing environment that includes input 606, output 604, and a communication connection 616. Output 604 may include a display device, such as a touchscreen, that also may serve as an input device. The input 606 may include one or more of a touchscreen, touchpad, mouse, keyboard, camera, one or more device-specific buttons, one or more sensors integrated within or coupled via wired or wireless data connections to the machine 600, and other input devices. The computer may operate in a networked environment using a communication connection to connect to one or more remote computers, such as database servers, including cloud-based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 602 of the machine 600. A hard drive, CD-ROM, and RAM are some examples of articles including a non-transitory computer-readable medium such as a storage device. For example, a computer program 618 may be used to cause processing unit 602 to perform one or more methods or algorithms described herein.

Some embodiments can be implemented using, at one or more operations, aspects of artificial intelligence (AI), including or processing and inferences performed using machine learning (ML) or neural networks (NNs). AI is a field of technology concerned with developing decision-making systems to perform cognitive tasks that have traditionally required a living actor, such as a person. Neural networks (NNs) are computational structures that are loosely modeled on biological neurons. Generally, NNs encode information (e.g., data or decision making) via weighted connections (e.g., synapses) between nodes (e.g., neurons). Modern NNs are foundational to many AI applications.

Many NNs are represented as matrices of weights that correspond to the modeled connections. NNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the NN graph-if the threshold is not exceeded then, generally, the value is not transmitted to a down-graph neuron and the synaptic connection remains inactive. The process of weighting and testing continues until an output neuron is reached: the pattern and values of the output neurons constituting the result of the NN processing.

The correct operation of most NNs relies on accurate weights. However, NN designers do not generally know which weights will work for a given application. Instead, a training process (sometimes including ML) is used to arrive at appropriate weights. NN designers typically choose a number of neuron layers or specific connections between layers including circular connection. Instead, a training process generally proceeds by selecting initial weights, which may be specifically or randomly selected. Training data is fed into the NN and results are compared to an objective function that provides an indication of error. The error indication is a measure of how wrong the NN's result is compared to an expected result. This error is then used to correct the weights. Ove iterations, the weights can collectively converge to encode the operational data into the NN. This process may be called an optimization of the objective function (e.g., a cost or loss function), whereby the cost or loss is reduced or even minimized.

A gradient descent technique can be used to perform the objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight can move towards the "correct," or operationally useful, value. In some implementations, the amount, or step size, of movement is fixed (e.g., the same from iteration to iteration). Small step sizes tend to take a long time to converge, whereas large step sizes may oscillate around the correct value or exhibit other undesirable behavior. Variable step sizes may be attempted to provide faster convergence without the downsides of large or small step sizes.

Backpropagation is a technique whereby training data is fed forward through the NN—here "forward" means that the data starts at the input neurons and follows the directed graph of neuron connections until the output neurons are reached—and the objective function is applied backwards through the NN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of NNs. Any well-known optimization algorithm for back propagation may be used, such as stochastic gradient descent (SGD), Adam, etc.

In the FIGS., a same number with a different letter suffix represents a similar item. A reference number without the suffix refers to the items with the same number with a letter suffix generally. Different numbers with same suffixes are associated with each other. Thus, the alert 220 refers generally to alerts 220A, 220B, 220C, 220D, and 220E and software control 222A is associated with the alert 220A.

What follows is a description of Examples to help aid understanding of disclosed subject matter:

Example 1 includes a system comprising processing circuitry, and a memory device coupled to the processing circuitry, the memory device including instructions stored thereon for execution by the processing circuitry to perform operations for computer security, the operations comprising providing an alert to a device of a first cloud user in response to determining an operation performed on a cloud resource is inconsistent with a behavior profile that defines normal operation of the cloud resource, receiving feedback from the first cloud user regarding the alert, and generating, for a second, different cloud user and by prioritizing a second alert based on the feedback from the first cloud user, a second alert.

In Example 2, Example 1 can further include, wherein the operations further comprise, before generating the second alert, identifying the second cloud user by determining that a characteristic of the first cloud user is the same as a characteristic of the second cloud user.

In Example 3, Example 2 can further include, wherein the second cloud user has provided less feedback than the first cloud user.

In Example 4, at least one of Examples 2-3 can further include, wherein determining that the characteristic of the first cloud user is the same as the characteristic of the second cloud user includes using an embedding technique or a collaborative filtering technique.

In Example 5, at least one of Examples 2-4 can further include, wherein the characteristic includes at least one of: resource access, account type, resource subscription, number of cloud resources subscribed to, time of access of a cloud resource, or number of users.

In Example 6, at least one of Examples 1-5 can further include, wherein the operations further comprise inferring further feedback from the first cloud user based on interaction with security alerts on the device.

In Example 7, Example 6 can further include, wherein inferring the feedback includes: identifying that the first cloud user has selected the alert and has not selected a third alert provided to the first cloud user and prioritizing future alerts of a same type as the alert over future alerts of a same type as the third alert.

In Example 8, at least one of Examples 1-7 can further include, wherein the feedback includes data indicating whether the alert is relevant to the first cloud user, not relevant to the first cloud user, the security alert is a false positive, or the security alert is a true positive.

In Example 9, at least one of Examples 1-8 can further include, wherein generating the second alert includes altering a score associated with the second alert based on the feedback from the first cloud user.

Example 10 includes a non-transitory machine-readable medium including instructions that, when executed by a machine, configure the machine to perform operations for cloud resource security using security alert feedback, the operations comprising one or more of the operations performed by the processing circuitry of at least one of Examples 1-9.

Example 11 includes a method of performing operations for cloud resource security using security alert feedback, the operations comprising one or more of the operations performed by the processing circuitry of at least one of Examples 1-9.

Example 12 includes a non-transitory machine-readable medium including instructions that, when executed by a machine, configure the machine to perform operations for cloud resource security using security alert feedback, the operations comprising providing an alert to a device of a first cloud user in response to determining an operation performed on a cloud resource is inconsistent with a behavior profile that defines normal operation of the cloud resource, receiving feedback from the first cloud user regarding the alert, and generating, for a second, different cloud user that includes a same characteristic as the first cloud user and by prioritizing a second alert based on the feedback from the first cloud user, the second alert.

In Example 13, Example 12 can further include, wherein the operations further comprise, determining whether the second cloud user has provided more than a threshold amount of feedback, and wherein generating the second alert occurs in response to determining the second cloud user has not provided more than the threshold amount of feedback.

In Example 14, at least one of Examples 12-13 can further include, wherein determining that the characteristic of the first cloud user is the same as the characteristic of the second cloud user includes using an embedding technique or a collaborative filtering technique.

In Example 15, at least one of Examples 12-14 can further include, wherein the characteristic includes at least one of: resource access, account type, resource subscription, number of cloud resources subscribed to, time of access of a cloud resource, or number of users.

In Example 16, at least one of Examples 12-15 can further include, wherein the operations further comprise inferring further feedback from the first cloud user based on interaction with security alerts on the device.

In Example 17, Example 16 can further include, wherein inferring the feedback includes: identifying that the first cloud user has selected the alert and has not selected a third alert provided to the first cloud user and prioritizing future alerts of a same type as the alert over future alerts of a same type as the third alert.

In Example 18, at least one of Examples 12-17 can further include, wherein the feedback includes data indicating whether the alert is relevant to the first cloud user, not relevant to the first cloud user, the security alert is a false positive, or the security alert is a true positive.

In Example 19, at least one of Examples 12-18 can further include, wherein generating the second alert includes altering a score associated with the second alert based on the feedback from the first cloud user.

In Example 20, a method or processing circuitry of a system can include performing the operations of at least one of Examples 12-19.

Example 21 includes a method for cloud resource security using security alert feedback, the method comprising providing an alert to a device of a first cloud user in response to determining an operation performed on a cloud resource is inconsistent with a behavior profile that defines normal operation of the cloud resource, receiving feedback from the first cloud user regarding the alert, and generating, using an embedding technique, for a second, different cloud user that includes a same characteristic as the first cloud user, and by prioritizing a second alert based on the feedback from the first cloud user, the second alert.

In Example 22, Example 21 can further include, wherein the feedback includes data indicating whether the alert is relevant to the first cloud user, not relevant to the first cloud user, the security alert is a false positive, or the security alert is a true positive.

In Example 23, at least one of Examples 21-22 can further include, wherein generating the second alert includes altering a score associated with the second alert based on the feedback from the first cloud user.

In Example 24, at least one of Examples 21-23 can further include, wherein the characteristic includes at least one of: resource access, account type, resource subscription, number of cloud resources subscribed to, time of access of a cloud resource, or number of users.

In Example 25, at least one of Examples 21-24 can further include, wherein the operations further comprise inferring further feedback from the first cloud user based on interaction with security alerts on the device.

In Example 26, at least one of Examples 21-25 can further include an operation performed by the processing circuitry of at least one of Examples 1-9.

Although a few embodiments have been described in detail above, other modifications are possible. For example, the logic flows depicted in the figures do not require the order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A system comprising:
   processing circuitry; and
   a memory device coupled to the processing circuitry, the memory device including instructions stored thereon for execution by the processing circuitry to perform operations for computer security, the operations comprising:
   providing an alert to a device of a first cloud user in response to determining an operation performed by a cloud resource is inconsistent with a behavior profile that defines normal operations performed by the cloud resource including a percentage of cloud resources same as the cloud resource that access a port, a percentage of the cloud resources that read to the port, and a percentage of the cloud resources that write to the port;
   receiving feedback from the first cloud user regarding the alert; and
   providing, for a second, different cloud user and by prioritizing a second alert based on the feedback from the first cloud user, a second alert.

2. The system of claim 1, wherein the operations further comprise, before generating the second alert, identifying the second cloud user by determining that a characteristic of the first cloud user is the same as a characteristic of the second cloud user.

3. The system of claim 2, wherein the second cloud user has provided less feedback than the first cloud user.

4. The system of claim 2, wherein the behavior profile further includes one or more of processor bandwidth used in operating the cloud resource, memory space allocated in operation the cloud resource, memory space consumed in operation of the cloud resource, or time duration between specific operations of the cloud resource.

5. The system of claim 2, wherein the characteristic includes at least one of: resource access, account type, resource subscription, number of cloud resources subscribed to, time of access of a cloud resource, or number of users.

6. The system of claim 1, wherein the operations further comprise inferring further feedback from the first cloud user based on interaction with security alerts on the device.

7. The system of claim 6, wherein inferring the feedback includes: identifying that the first cloud user has selected the alert and has not selected a third alert provided to the first cloud user and prioritizing future alerts of a same type as the alert over future alerts of a same type as the third alert.

8. The system of claim 1, wherein the feedback includes data indicating whether the alert is relevant to the first cloud user, not relevant to the first cloud user, the security alert is a false positive, or the security alert is a true positive.

9. The system of claim 1, wherein generating the second alert includes altering a score associated with the second alert based on the feedback from the first cloud user.

10. A non-transitory machine-readable medium including instructions that, when executed by a machine, configure the machine to perform operations for cloud resource security using security alert feedback, the operations comprising:
    providing an alert to a device of a first cloud user in response to determining an operation performed by a cloud resource is inconsistent with a behavior profile that defines normal operations performed by the cloud resource including a percentage of cloud resources same as the cloud resource that access a port, a percentage of the cloud resources that read to the port, and a percentage of the cloud resources that write to the port;

receiving feedback from the first cloud user regarding the alert; and generating, for a second, different cloud user that includes a same characteristic as the first cloud user and by prioritizing a second alert based on the feedback from the first cloud user, the second alert.

11. The non-transitory machine-readable medium of claim 10, wherein the operations further comprise, determining whether the second cloud user has provided more than a threshold amount of feedback, and wherein generating the second alert occurs in response to determining the second cloud user has not provided more than the threshold amount of feedback.

12. The non-transitory machine-readable medium of claim 10, wherein determining that the characteristic of the first cloud user is the same as the characteristic of the second cloud user includes using an embedding technique or a collaborative filtering technique.

13. The non-transitory machine-readable medium of claim 10, wherein the characteristic includes at least one of: resource access, account type, resource subscription, number of cloud resources subscribed to, time of access of a cloud resource, or number of users.

14. The non-transitory machine-readable medium of claim 10, wherein the operations further comprise inferring further feedback from the first cloud user based on interaction with security alerts on the device.

15. The non-transitory machine-readable medium of claim 14, wherein inferring the feedback includes: identifying that the first cloud user has selected the alert and has not selected a third alert provided to the first cloud user and prioritizing future alerts of a same type as the alert over future alerts of a same type as the third alert.

16. A method for cloud resource security using security alert feedback, the method comprising:

providing an alert to a device of a first cloud user in response to determining an operation performed by a cloud resource is inconsistent with a behavior profile that defines normal operations performed by the cloud resource including a percentage of cloud resources same as the cloud resource that access a port, a percentage of the cloud resources that read to the port, and a percentage of the cloud resources that write to the port;

receiving feedback from the first cloud user regarding the alert; and generating, using an embedding technique, for a second, different cloud user that includes a same characteristic as the first cloud user, and by prioritizing a second alert based on the feedback from the first cloud user, the second alert.

17. The method of claim 16, wherein the feedback includes data indicating whether the alert is relevant to the first cloud user, not relevant to the first cloud user, the security alert is a false positive, or the security alert is a true positive.

18. The method of claim 16, wherein generating the second alert includes altering a score associated with the second alert based on the feedback from the first cloud user.

19. The method of claim 16, wherein the characteristic includes at least one of: resource access, account type, resource subscription, number of cloud resources subscribed to, time of access of a cloud resource, or number of users.

20. The method of claim 16, wherein the operations further comprise inferring further feedback from the first cloud user based on interaction with security alerts on the device.

* * * * *